(12) United States Patent
Inui et al.

(10) Patent No.: US 7,201,189 B2
(45) Date of Patent: Apr. 10, 2007

(54) REED VALVE AND REED VALVE ASSEMBLY

(75) Inventors: Hiroatu Inui, Wako (JP); Takanori Osuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 10/803,067

(22) Filed: Mar. 16, 2004

(65) Prior Publication Data

US 2004/0216791 A1 Nov. 4, 2004

(30) Foreign Application Priority Data

Mar. 20, 2003 (JP) ............................. 2003-077567
Jan. 13, 2004 (JP) ............................. 2004-005386

(51) Int. Cl.
*F16K 15/14* (2006.01)

(52) U.S. Cl. ................. 137/855; 137/512.15; 137/856; 60/293

(58) Field of Classification Search ............. 137/512.1, 137/512.15, 855, 856; 60/293
See application file for complete search history.

(56) References Cited

U.S. PATENT DOCUMENTS 3,968,925 A    7/1976  Johnston et al.
4,083,184 A    4/1978  Ushijima et al.
4,387,565 A    6/1983  Otani et al.
5,373,867 A *  12/1994 Boyesen et al. ............ 137/514
6,561,143 B2 * 5/2003  Holtzman ................. 123/73 V

FOREIGN PATENT DOCUMENTS

FR    2 578 943       9/1986
JP    2002-250233     9/2002

* cited by examiner

*Primary Examiner*—Ramesh Krishnamurthy
(74) *Attorney, Agent, or Firm*—Hamre, Schumann, Mueller and Larson, PC

(57) ABSTRACT

A reed valve having a plate shaped support substrate with a valve hole formed in a central section passing through in a plate thickness direction is provided. A flexible plate-shaped reed covering the valve hole at one surface of the support substrate and having one end in a longitudinal direction that is fixed to the support substrate. The support substrate has a rib extending along a center line in a longitudinal direction of the inside of the valve hole, to divide the valve hole into two spaces. A surface of the rib opposite to the reed is positioned on substantially the same plane as a surface of the support substrate to which the rib is attached, and is adjacent to the reed.

8 Claims, 6 Drawing Sheets

REED VALVE AND REED VALVE ASSEMBLY

BACKGROUND OF THE INVENTION

1. Field of the Invention

The present invention relates to a reed valve and reed valve assembly suitable for supplying air to an intake system or exhaust system of an internal combustion engine (engine), and particularly to a reed valve and reed valve assembly used to supply secondary air to an exhaust port of an engine.

2. Description of the Related Art

A secondary air supply port of an engine has been used as an exhaust gas regulating counter-measure. The secondary air supply port supplies air from an air cleaner to an exhaust port to recombust an uncombusted component contained in the exhaust gas. In such a case, a reed valve is generally provided at some point in the secondary air supply unit so that exhaust gas from the exhaust port does not flow back to the air cleaner. In order to achieve this, air is supplied from the air cleaner to the exhaust port by taking advantage of a pressure difference between areas above and below the reed valve arising in the exhaust port as a result of pulsation of the exhaust gas. Specifically, when the pressure at the exhaust port side is low, the reed valve is opened to supply air from the air cleaner to the exhaust port, while when the pressure at the exhaust port side is high the reed valve is closed to prevent exhaust gas flowing back to the air cleaner.

One such reed valve has a valve hole in a central part of a plate shaped support substrate, passing through in the plate thickness direction, with a reed arranged so as to cover this valve hole. One end of the reed is fixed to a support base in the longitudinal direction, and in the case of using a secondary air supply unit the reed valve is arranged so that a surface to which the reed is attached is positioned at an exhaust port side. Japanese Patent Laid-open No. 2002-250233 disclosed an example of such a reed valve.

However, in the case of a reed valve having the above-described structure, achieving the paper plate thickness can be difficult. Excessive pressure to the reed valve can occur, such as when there us a rapid transition from a low pressure state at the exhaust port side to a high pressure state and, therefore, the plate must be thick. On the other hand, to increase followability of the reed valve the plate thickness should be thin. Accordingly, there is a need for a reed valve that can accomplish both of these conflicting requirements.

SUMMARY OF THE INVENTION

The present invention has been conceived in view of the above-described problem, and an object of the invention is to provide a reed valve or a reed valve assembly having high followability even with a reed of thin plate thickness, and with a structure that can withstand excessive pressure.

In order to solve the above described problems, a reed valve of the present invention comprises a plate shaped support substrate with a valve hole formed in a central section passing through in a plate thickness direction, and a flexible plate-shaped reed covering the valve hole at one surface of the support substrate and having one end in a longitudinal direction that is fixed to the support substrate. The support substrate has a rib extending along a center line in a longitudinal direction of the inside of the valve hole, to divide the valve hole into two spaces, and a surface of the rib opposite to the reed is positioned on substantially the same plane as a surface of the support substrate to which the rib is attached, or inside the valve hole, and is adjacent to the reed.

It is preferable for the rib to have a grooved section formed in a surface opposite to the reed penetrating in a width direction of the rib, and for the grooved section to pass through a space inside the valve hole divided by the rib.

It is also preferable for the grooved section to be formed at a part of the rib that is close to an end opposite to an end to which the reed is fixed.

It is also preferable for a surface of the rib opposite to a surface facing the reed to be formed having a V-shaped cross section projecting outwards.

Alternatively, a reed valve assembly of the present invention comprises a reed valve, provided with a plate shaped support substrate with a valve hole formed in a central section passing through in a plate thickness direction, and a flexible plate-shaped reed covering the valve hole at one surface of the support substrate and having one end in a longitudinal direction that is fixed to the support substrate, and a reed valve cover forming an air intake pipe for supplying air for passing the reed vale, attached so as to cover a surface opposite to a surface to which the reed is attached. A rib extending from a surface facing the valve hole to the valve hole side is formed at an inner side surface of the reed valve cover.

At this time, when the reed valve cover is attached to the reed valve, there is preferably a specified gap between the rib and the reed.

The above described reed valve or reed valve assembly preferably have the reed valve attached inside a secondary air supply passage for supplying secondary air from an intake unit (for example, the air cleaner 19 of the embodiments) of an internal combustion engine (for example, the engine E of the embodiments) to an exhaust port, with a surface to which the reed is attached facing towards the exhaust port side, used in such a way that exhaust gas inside the exhaust port does not flow back to the intake device through the secondary air supply passage.

If the reed valve of the present invention has the above described structure, since the reed is pressed against the rib and held, even if excessive pressure is applied to the reed from a surface side where the reed of the reed valve is arranged, it is possible to make the reed plate thickness thin, and to increase followability of the reed valve. Also, it is possible to make seating noise of the reed due to the rib low.

Also, by providing a grooved section in the rib of the reed valve of the present invention, when pressure is increased from a surface reverse to the surface to which the reed of the reed valve is attached and the reed is opened, since gas flows passing through this grooved section the rib hindering the flow of gas through this reed valve is prevented, and it is possible to reduce the effect the rib has on flow amount.

At this time, by forming a groove section on an opposite surface to the end on which the reed is fixed, when the reed is opened a microscopic amount a grooved section is formed close to the open portion, which means that it is possible to prevent flow rate being reduced by the rib even with a microscopic opening amount.

Also, with the reed valve having the above described structure, by causing a surface of the rib opposite to the reed to project outwards towards the outside, since gas flowing in to the reed valve flows along this projecting section of the rib an into the valve hole, it is possible to have flow that is not disturbed by the rib.

Also, by giving the reed valve assembly of the present invention the above described structure, since the reed is held by the rib, even if excessive pressure is applied to the reed from a surface side where the reed of the reed valve is arranged, it is possible to make the reed plate thickness thin, and to increase followability of the reed valve.

When the reed valve cover is attached, by having a structure where there is a specified distance between the reed and the rib, the gas flow is not disturbed by the rib and the reed can be held.

Further, by fitting the reed valve or reed valve assembly of the present invention inside a secondary gas supply passage of an internal combustion engine, when secondary gas is supplied and uncombusted components contained in exhaust gas inside the exhaust port are combusted to raise the pressure inside the exhaust port rapidly, even if excessive pressure is applied to the reed, the reed is held by the rib which means that it is possible to make the plate thickness of the reed thin, and it is thus possible to increase followability of the reed valve.

DETAILED DESCRIPTION OF THE INVENTION

Preferred embodiments of the present invention will now be described with reference to the drawings. First, a description will be given using FIG. 2, which shows an engine using the reed valve or reed valve assembly of the present invention, and a secondary air supply unit attached to this engine. The engine E is made up of a cylinder block 1, a cylinder head 2 and a cylinder head cover 3. An intake port 6 and an exhaust port 7 respectively communicate, via an intake opening and an exhaust opening, with a combustion chamber 5 formed by the cylinder block 1, cylinder head 2 and piston 4 positioned inside a cylinder of the cylinder block 1. A mushroom-shaped intake valve 8 and a mushroom shaped exhaust valve 9 have one end supported on a retainer attached to a valve stem, and another end urged in a direction normally closing the respective intake opening and exhaust opening by valve springs 10, 11 supported in the cylinder head 12. The intake valve 8 and exhaust valve 9 are operated to open and close by a cam mechanism constituted by cams and rocker arms, etc. Air that has been purified by an air filter 19 is supplied from the intake port 6 together with fuel to the combustion chamber 5 and combusted. Exhaust air is discharged to the outside via the exhaust port 7.

Figure 2:
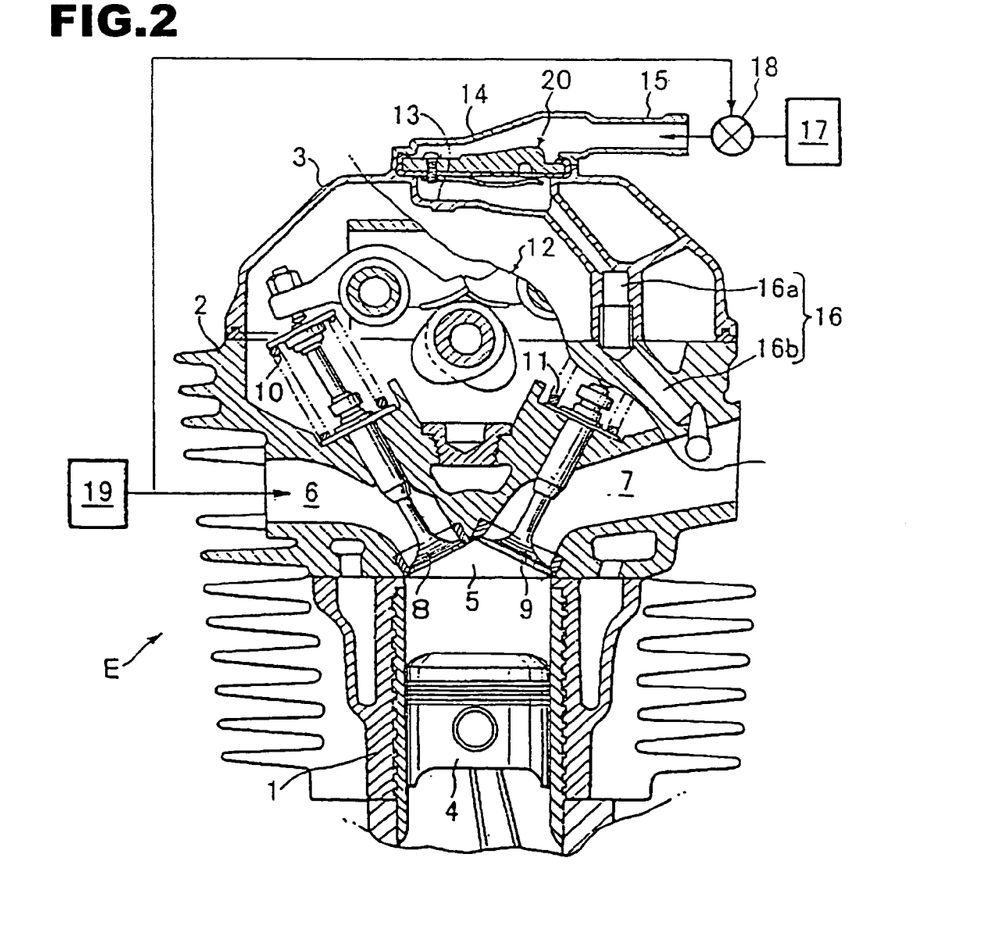
FIG. 2 is a cross sectional view of an internal combustion engine fitted with the reed valve of the present invention.
Figure 3:
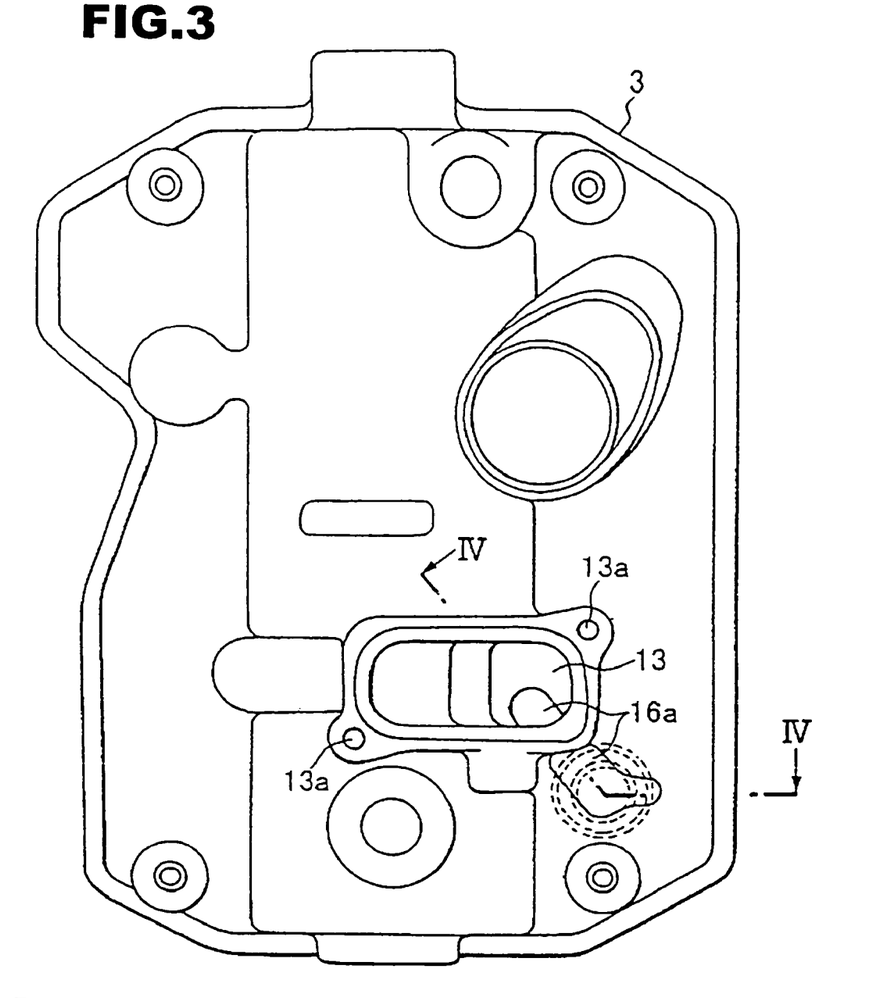
FIG. 3 is a plan view of a cylinder head cover.
Figure 4:
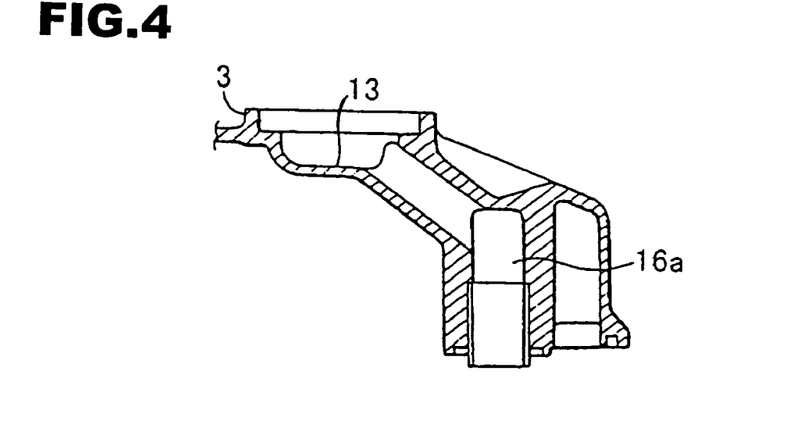
FIG. 4 is a cross sectional view taken along line IV—IV in FIG. 3.

As shown in FIG. 3 and FIG. 4, a valve housing chamber 13 is formed in an upper part of the cylinder head cover 3, and an upper passage 16a is formed by extending the inside of the cylinder head cover 3 downwards from the bottom of this valve housing chamber 13. As shown in FIG. 2, a lower passage 16b is formed in the cylinder head 2 linking from an upper part to the intake port 6. When the cylinder head cover 3 is attached to the cylinder head 2 the upper passage 16a and lower passage 16b are connected to form a secondary air supply passage 16.

Figure 5:
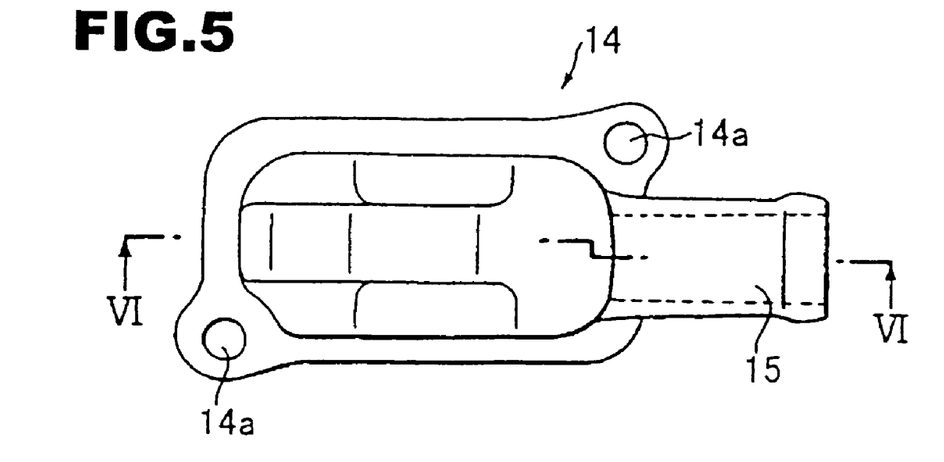
FIG. 5 is a plan view of a reed valve cover used in the reed valve of the present invention.
Figure 6:
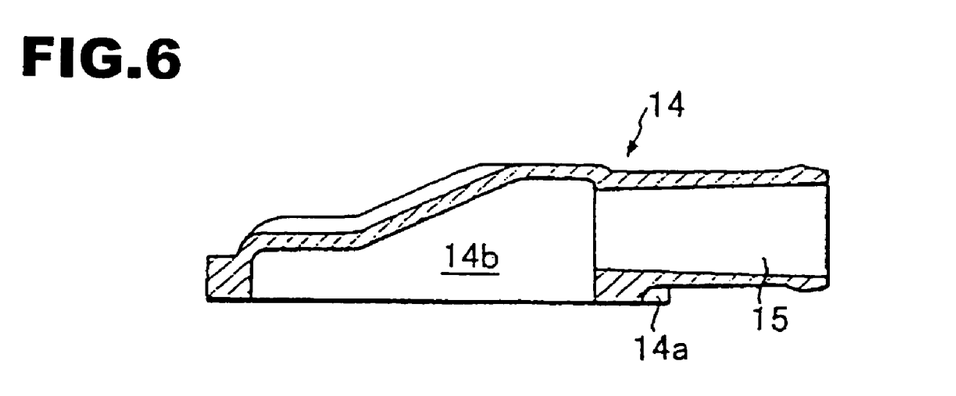
FIG. 6 is a cross sectional view taken along line VI—VI in FIG. 5.
Figure 7:
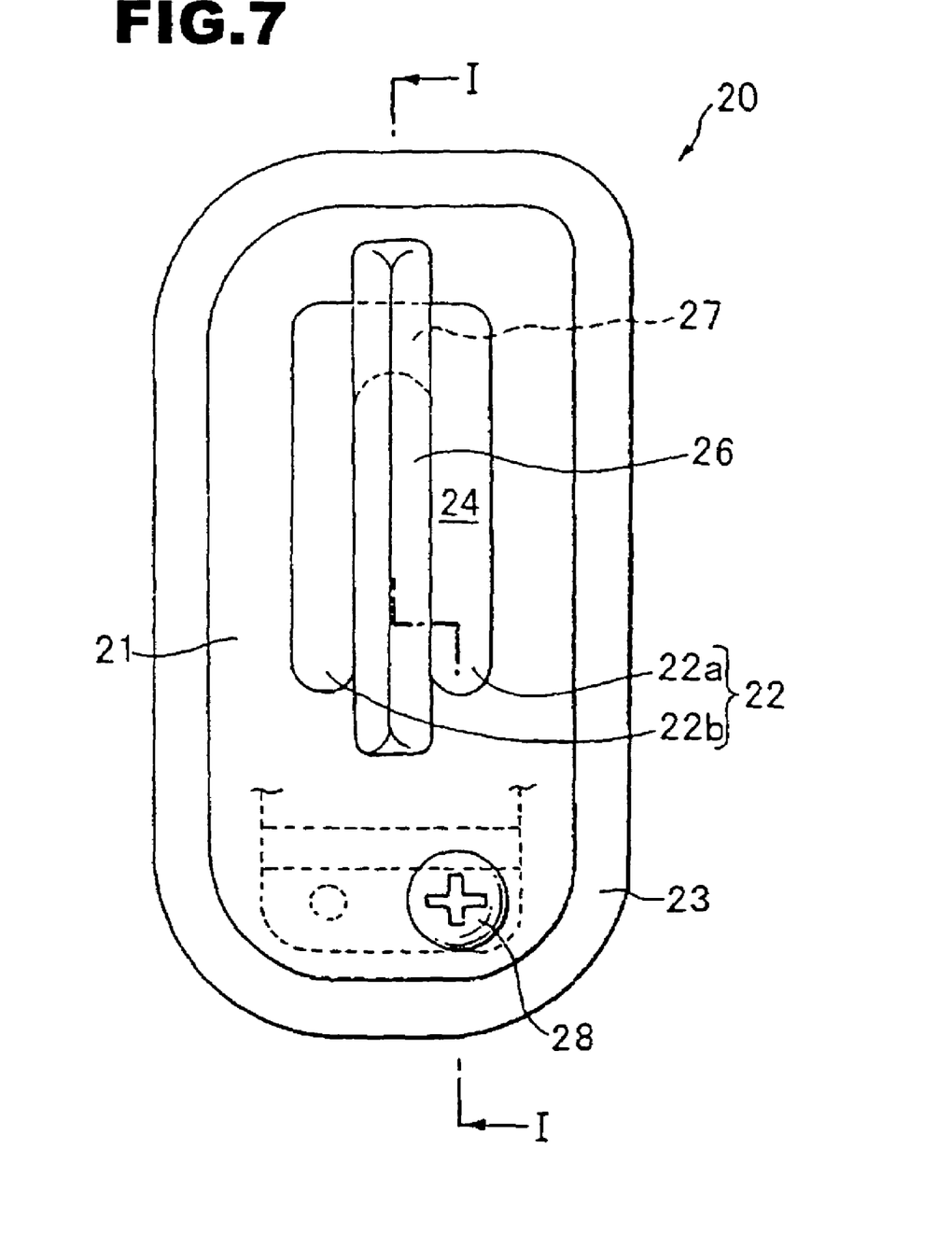
FIG. 7 is a plan view of a reed valve of the present invention.
Figure 8:
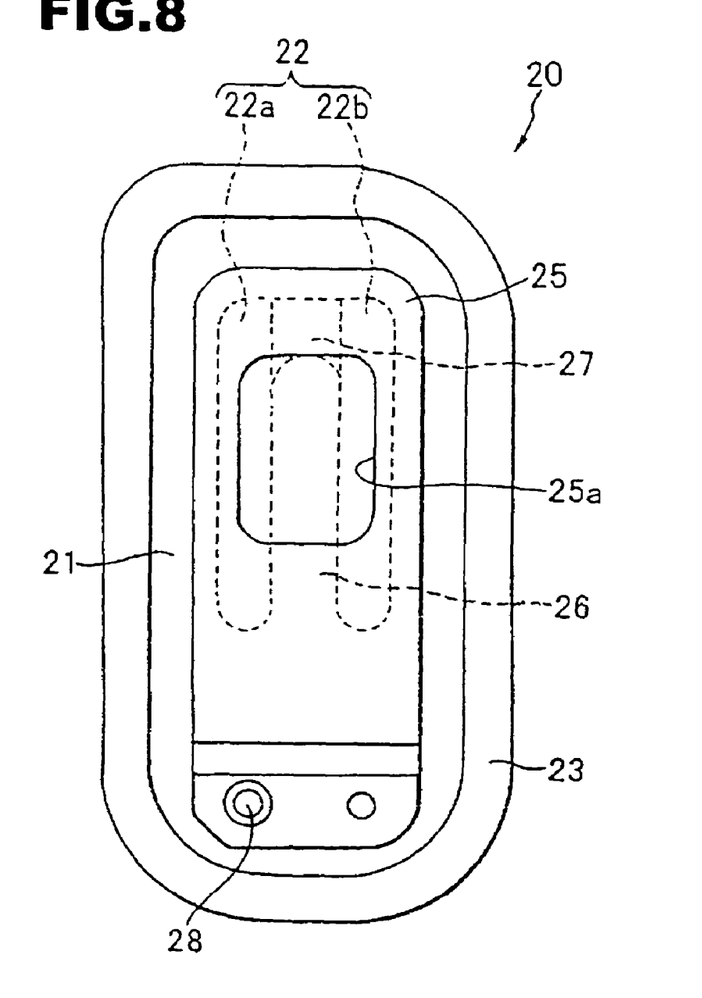
FIG. 8 is a bottom view of a reed valve of the present invention.
Figure 9:
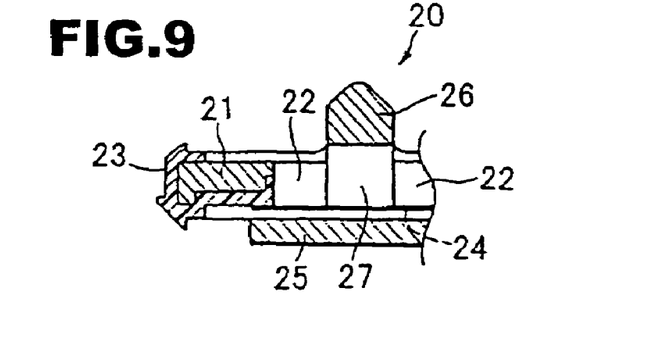
FIG. 9 is a cross sectional view taken along line IX—IX in FIG. 1.

Referring again to FIG. 2, a reed valve 20 is attached to an upper part of the valve housing chamber 13, and a reed of the reed valve 20 at this time is arranged so as to be positioned at the valve housing chamber 13 side (the reed valve 20 will be described in detail later). A reed valve cover 14, as shown in FIG. 5 and FIG. 6, is then attached to an upper part of the reed valve 20. The reed valve cover 14 has an inner space 14b opening downwards and an air intake pipe 15 formed so that it extends in a substantially horizontal direction to connect to the inner space 14b. The reed valve cover 14 is linked to the cylinder head cover 3 by fitting bolts into attachment sections 14a, 14a formed in the reed valve cover 14 and attachment sections 13a, 13a formed in the cylinder head cover 3.

With the engine E constructed in this way, air that has been purified by the air filter 19 is taken in from the air intake pipe 15 of the reed valve cover 14, passes through a secondary air supply unit comprised of the reed valve 20 and the secondary air supply passage 16, and is supplied as secondary air to the exhaust port 7. This secondary air supply unit has secondary air supply control solenoid 18 provided between the air filter 19 and the reed valve cover 14. The secondary air supply control solenoid 18 is controlled by an engine control unit 17. Therefore, the secondary air supply control solenoid 18 is opened and closed depending on the running conditions (water temperature, intake air temperature, throttle position, engine speed, etc.) of a vehicle having the engine E mounted therein to perform recombustion of the exhaust gas at optimum conditions. As a result, there is a possibility that a large pressure will be applied to a reed valve used in the secondary air supply unit when recombusting uncombusted components contained in the exhaust gas.

Next, a description will be given of the reed valve 20 of the present invention used in this engine E. FIG. 1 and FIGS. 7–9 show the reed valve 20 of the present invention. The reed valve 20 has a plate shaped support substrate 21 formed in a substantially flat rectangular shape using a metal such as aluminum. A valve hole 22 is formed passing through a central part of this support substrate 21 in a plate thickness direction. A thin film gasket section 23, formed using a flexible body of rubber or the like, is formed on upper and lower surfaces and an outer surface of the outer section of the support substrate 21. Three annular projections 23a are formed on the upper and lower surfaces and an outer surface of this gasket section 23. When the reed valve 20 is attached to the engine E, the annular projections 23a contact the valve housing chamber 13 and the reed valve cover 14 to abut and hold the reed valve 20, and form a seal so that gas does not flow out from the abutted and held sections. Also, by using the gasket section 23, vibration of the reed valve 20 being transmitted to the engine E is reduced.

A reed 24 is formed in a substantially rectangular flat plate shape capable of opening and closing depending on pressure exerted by gas passing through the valve hole 22. The reed 24 is arranged on one surface of the support substrate 21 (the lower surface in FIG. 1) so as to block off the valve hole 22. A stopper 25 for regulating an open position of the reed 24 is attached to a lower surface side of the reed 24. The reed 24 and one end of the stopper 25 in a longitudinal direction are fixed in a cantilever shape using a linking member inserted from above the support substrate 21 (a surface opposite to the surface the reed 24 is attached to). It is possible to use a screw or rivet as the linking member 28.

Figure 1:
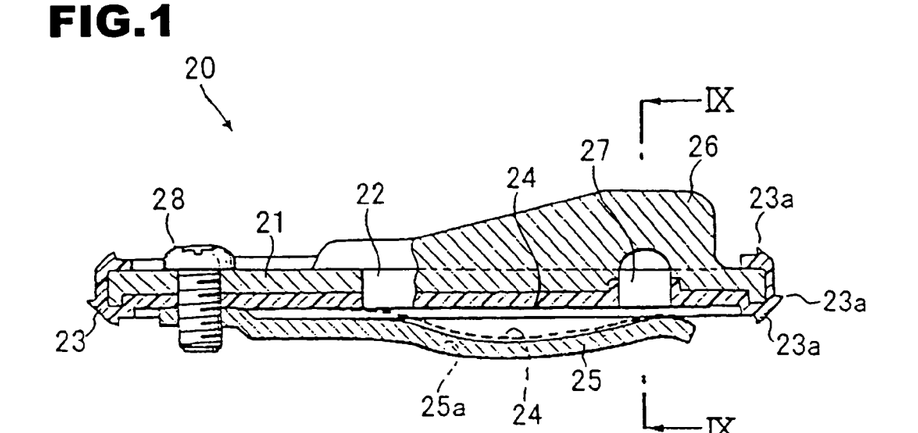
FIG. 1 is a longitudinal cross sectional view taken along line I—I in FIG. 7 of a reed valve of the present invention.

The reed 24 enables the flow of gas from above the valve hole 22 to below (this direction will be called "forward" in the rest of the description), and prevents flow in the opposite direction (this direction will be called "backwards" in the rest of the description), and is formed of a flexible thin plate of metal or resin.

The stopper 25 is formed from a rigid metal or the like, and sections of the stopper 25 other than support ends are formed so as to be separated from the support substrate 21, and in particular, so as to be as far apart as possible from the lower surface of the support substrate 21 at a central part of the valve hole 22 in the longitudinal direction, and formed having a downwardly convex shape. In this way, as shown by the dotted line in FIG. 1, when the reed 24 is open a lift amount of the reed 24 (amount of separation from the lower surface of the support substrate 21) is regulated by the stopper 25, and a position of maximum possible separation from the lower surface of the support substrate 21 as a result of the opening and closing operation of the reed 24 is regulated so as to become a central section of the valve hole 22 in the longitudinal direction. Also, an amount of lift of a tip section positioned at the free end side of the reed 17 is regulated using the stopper 35 formed in this way so as the made small. A punched hole 25a passing through in a plate thickness direction and having a smaller area than the valve hole 22 is formed in a section of the stopper 25 opposite to the 22.

The support substrate 21 is formed with a rib 26 extending along a center line in the longitudinal direction of the valve hole 22 for dividing the inside of the valve hole 22 into two spaces 22a and 22b. The above described gasket section 23 is formed extending to the lower surface (reed 24 side surface) of this rib 26, and a lower surface of the rib 26 containing the gasket section 23 is positioned on substantially the same plane as a peripheral section (here, since it is seated when the reed 24 is closed, it will be called a seating surface) of the valve hole 22 at the lower surface of the support substrate 21 or inside the valve hole 22. Therefore, with the reed 24 in a closed state the lower surface of the rib 26 and the upper surface of the reed 24 are adjacent, and even if gas pressure is excessively applied in an inverse direction from a surface side where the reed 24 is positioned, since the reed 24 is pressed against and held on the rib 26, the reed 24 is not forced inside the valve hole 22. Also, because of the rib 26 it is possible to reduce seating noise when the reed 24 seats on the seating surface.

A grooved section 27 passing through a width direction of the side surface is formed in a reed 24 side surface of the rib 26. Using this grooved section 27, the valve hole 22 is connected to the two spaces 22a and 22b divided by the rib 26. As a result, when pressure is applied to the reed valve 20 in a forward direction and gas flows in the valve hole 22, gas flows in this grooved section 27 and flows out through a space formed between the reed 24 and a lower surface (seating surface) of the support substrate 21. As a result gas flow is not disturbed by the rib 26. In particular, when extremely slight pressure is applied from above the reed valve 20, the free end of the reed 24 at a section opposite to the valve hole 22 moves downward and opens. As a result, by forming the grooved section 27 in the lower surface of the rib 26 positioned inside the valve hole 22 at the free end side of the reed 24 it is possible to have gas flow through this grooved section 27, which results in a more effective structure where the rib 26 does not hinder gas flow.

Also, a surface of the rib 26 opposite to the reed 24 has a roofed shape projecting outwards, and is V-shaped in cross section. As a result, gas flowing in to the reed valve 20 (gas flowing in a forward direction) flows in along the surface of the projecting part of the rib 26 and into the valve hole 22, which means that the inflow of gas is not disturbed by the rib 26.

In the description above, since the reed 24 is held in place when gas pressure in a reverse direction is applied, a rib 26 is formed in the support substrate 21 constituting the reed valve 20 so that the reed 24 is not forced into the valve hole 22, but it is also possible to form this rib at a reed valve case side and to have a reed valve assembly comprising the reed valve and a reed valve case. Implementation of a reed valve assembly will be described with reference to FIGS. 10–13.

Figure 10:
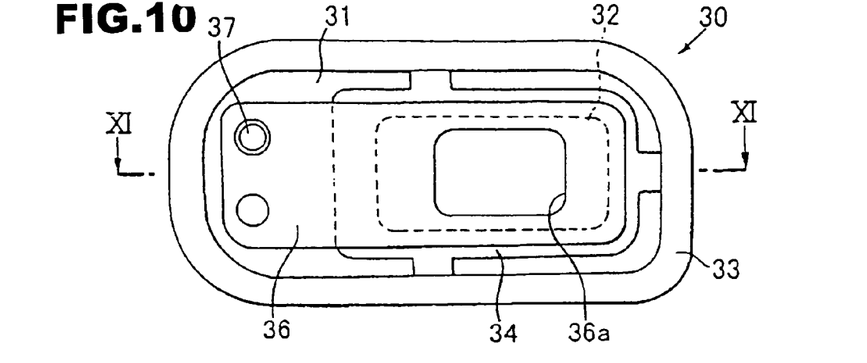
FIG. 10 is a bottom view of a reed valve constituting a reed valve assembly of the present invention.
Figure 11:
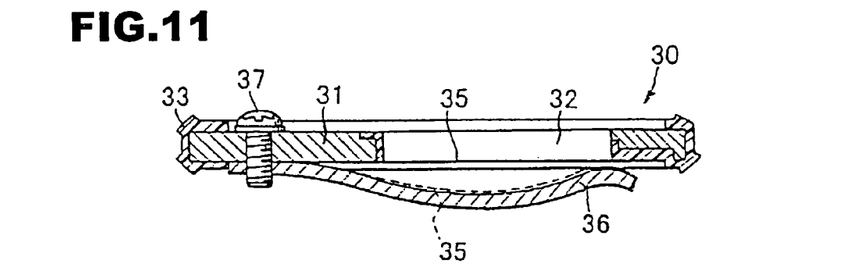
FIG. 11 is a cross sectional view taken along line XI—XI in FIG. 10.

First, referring to FIG. 10 and FIG. 11, a description will be given of a reed valve 30 constituting the reed valve assembly. The reed valve 30 also has a plate-shaped support substrate 31 formed in a flat substantially rectangular shape using metal such as aluminum. A valve hole 32 is formed in a substantially central part of this support substrate 31, passing through in a plate thickness direction. Also, a thin film first gasket section 33 made of a flexible material such as rubber is formed on the upper and lower surfaces of the outside of this support substrate 31 and an outer surface. Projections that are the same as the annular projections formed on the gasket section 23 in the description of the reed valve 20 above are formed at three places on this first gasket section 33, namely both the upper and lower surface and on the outer surface, and the effects and operation when attached to the engine are also the same.

A second gasket section 34 surrounding this valve hole 32 is formed in one surface (the lower surface in FIG. 11) of the support substrate 31, and this second gasket section 34 constitutes a seating surface of the reed 35. The reed 35 is then disposed so as to block off the valve hole 32 from a surface at the side where the second gasket section 34 is formed. A stopper 36 is arranged at a lower surface side of the reed 35. The reed 35 and the stopper 36 are attached with a linking member 37, in the same way as the reed valve 20 described above, and a punched hole 36a having a smaller area than the valve hole 32 is formed in a part of the stopper 36 that is opposite to the valve hole 32.

With the reed valve 30 having this structure also, if gas pressure in a forward direction is applied from an upper surface side (a surface side opposite to the surface where the reed 35 is arranged) of the reed valve 30, the reed 35 is opened (the state of the reed 35 shown by a dotted line in FIG. 11) and gas flows through the valve hole 32. Conversely, if gas pressure is applied in a backward direction from the lower surface side of the reed valve 30, backward gas flow is prevented.

Figure 12:
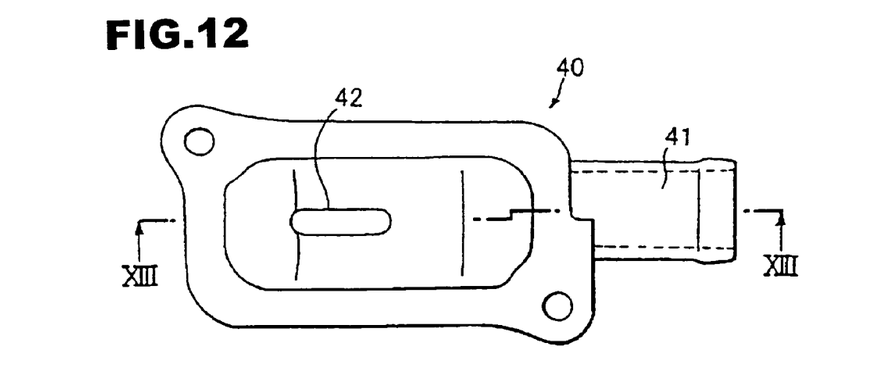
FIG. 12 is a bottom view of a reed valve cover constituting a reed valve assembly of the present invention.
Figure 13:
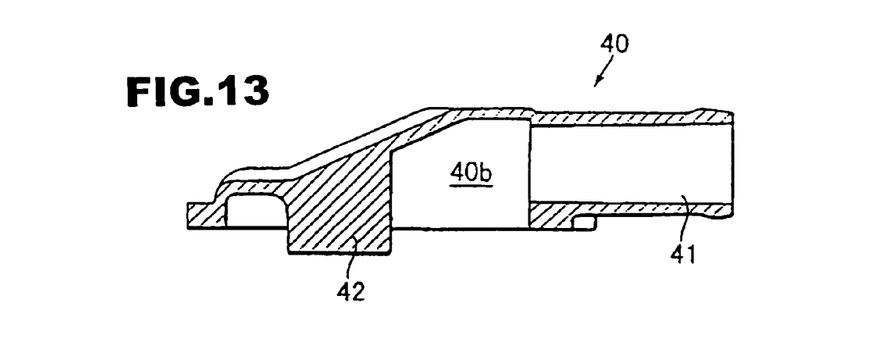
FIG. 13 is a cross sectional view taken along line XIII—XIII in FIG. 12.

Next, a description will be given of a reed valve cover 40 attached to the reed valve 30, referring to FIG. 12 and FIG. 13. The reed valve cover 40 is also the same as the reed valve cover 14 described above, having a space 40b inside opening downward and with an air intake pipe 41 formed so as to communicate with this inner space 40b. A rib 42 is then formed extending downwards from an upper surface of the inner space 40b (namely a surface opposite to the valve hole 32 when the reed valve case 40 is attached to the reed valve 30). A lower end of this rib 42 is positioned further down than a lower surface of the reed valve case 40, and the area of the lower surface of the rib 42 is smaller than the area of the valve hole 32. Therefore, when the reed valve case 40 is attached to the reed valve 30, this rib 42 is positioned inside the valve hole 32. At this time, a specified gap is formed between the lower surface of the rib 42 and the upper surface of the reed 35.

Using a reed valve assembly that is a combination of the reed valve 30 having the above described structure and the reed valve cover 40, even if gas pressure in a backward direction is applied from a surface where the reed 35 is positioned, since the reed 35 is pressed against and supported on the rib 42 the reed 35 is not forced into the valve hole 32 and it is possible to prevent damage to the reed valve 30. Also, because there is a specified gap between the lower surface of the rib 42 and the upper surface of the reed 35, when gas flows in a forward direction this rib 42 does not interfere with the gas flow. The method of the reed valve 30 and the reed valve cover 40 (reed valve assembly) to the cylinder head cover 3 is the same as for the reed valve 20 and the reed valve cover 14 described above.

As has been described above, according to the reed valve or reed valve assembly of the above described embodiment, by forming a rib 26, 42 on a reed valve cover 40 covering the reed valve 20 or reed valve assembly 30 and making the rib close to the reed 24, 35, even if excessive gas pressure is applied to the reed valve 20, 30 in a backward direction, since the reed 24, 35 is held by the rib 26, 42 it is possible to make the plate thickness of the reed 24, 35 thin, and it is therefore possible to increase the followability of the reed valve 20, 30. In particular, if the reed valve 20 or reed valve assembly 40 of the present invention is used in a secondary air supply unit (secondary air supply passage 16) of an engine E, by supplying secondary air and combusting non-combusted components contained in exhaust gas inside an exhaust port even if pressure inside the exhaust port rises abruptly the reed is not forced into the valve hole because the reed is pressed against and supported on this rib. Also, by making the plate thickness of the reed 24, 35 thin, it is also possible to have good followability for secondary air supply.

What is claimed is:

1. A reed valve comprising:
   a plate-shaped support substrate with a valve hole formed in a central section, the valve hole passing through the support substrate in a plate thickness direction; and
   a flexible plate-shaped reed covering the valve hole at one surface of the support substrate and having one end in a longitudinal direction that is fixed to the support substrate,
   wherein the support substrate has a rib extending along a center line in a longitudinal direction of the inside of the valve hole to divide the valve hole into two spaces,
   a surface of the rib opposite to the teed is positioned on substantially the same plane as a surface of the support substrate so that the reed contacts the rib or is adjacent to the rib, and
   wherein the rib projects beyond a surface of the support substrate opposite the one surface.

2. The reed valve of claim 1, wherein the rib has a grooved section formed in a surface opposite to the reed and penetrating in a width direction of the rib, and the grooved section passes through a space inside the valve hole divided by the rib.

3. The reed valve of claim 2, wherein the grooved section is formed at a part of the rib that is closer to an end that is opposite to an end to which the reed is fixed.

4. The reed valve of claim 1, wherein a surface of the rib opposite to a surface facing the reed is formed having a V-shaped cross section projecting outwards.

5. The reed valve of claim 1, wherein the reed valve is attached inside a secondary air supply passage for supplying secondary air from an intake unit of an internal combustion engine to an exhaust port, with a surface to which the reed is attached facing towards the exhaust port side, and the reed valve is configured so that exhaust gas inside the exhaust port does not flow back to the intake device through the secondary air supply passage.

6. A reed valve comprising:
   a support means with a valve hole formed in a central section, the valve hole passing through the support means in a thickness direction; thereof and
   a flexible reed means covering the valve hole at one surface of the support means and having one end in a longitudinal direction that is fixed to the support means
   wherein the support means has a rib extending along a center line in a longitudinal direction of the inside of the valve hole to divide the valve hole into two spaces,
   a surface of the rib opposite to the reed means is positioned on substantially the same plane as a surface of the support means so that the reed means contacts the rib or is adjacent to the rib, and
   the rib projects beyond a surface of the support means opposite the one surface.

7. A reed valve comprising:
   a plate-shaped support substrate with a valve hole formed in a central section, the valve hole passing through the support substrate in a plate thickness direction; and
   a flexible plate-shaped reed covering the valve hole at one surface of the support substrate and having one end in a longitudinal direction that is fixed to the support substrate,
   wherein the support substrate has a rib extending along a center line in a longitudinal direction of the inside of the valve hole to divide the valve hole into two spaces,
   a surface of the rib opposite tote reed is positioned on substantially the same plane as a surface of the support substrate to which the rib is attached and is adjacent to the reed, and
   wherein the rib has a grooved section formed in a surface opposite to the reed and penetrating in a width direction of the rib, and the grooved section passes through a space inside the valve hole divided by the rib.

8. The reed valve of claim 7, wherein the grooved section is formed at a part of the rib that is closer to an end tat is opposite to an end to which the reed is fixed.

* * * * *